United States Patent
Kovacs et al.

(10) Patent No.: US 7,743,107 B2
(45) Date of Patent: Jun. 22, 2010

(54) SYSTEM AND METHOD FOR USING REMOTE MODULE ON VIOS TO MANAGE BACKUPS TO REMOTE BACKUP SERVERS

(75) Inventors: Robert George Kovacs, Austin, TX (US); Anbazhagan Mani, Karnataka (IN); Morgan Jeffrey Rosas, Round Rock, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 11/952,188

(22) Filed: Dec. 7, 2007

(65) Prior Publication Data

US 2009/0150510 A1  Jun. 11, 2009

(51) Int. Cl.
  *G06F 15/167* (2006.01)
(52) U.S. Cl. .......................... 709/213; 711/6
(58) Field of Classification Search ................. 709/213, 709/214, 215, 216, 229; 711/62
  See application file for complete search history.

(56) References Cited

U.S. PATENT DOCUMENTS

| 6,260,069 | B1 * | 7/2001 | Anglin ................ 709/229 |
| 6,502,205 | B1 | 12/2002 | Yanai et al. |
| 2002/0095547 | A1 | 7/2002 | Watanabe et al. |
| 2006/0250945 | A1 * | 11/2006 | Fernandes et al. ........ 370/216 |

* cited by examiner

*Primary Examiner*—Ramy M Osman
*Assistant Examiner*—Marshall McLeod
(74) *Attorney, Agent, or Firm*—VanLeeuwen & VanLeeuwen; Libby Z. Handelsman

(57) ABSTRACT

A system, method, and program product is provided that receives a backup request at a virtual input/output server (VIOS) from a client of the VIOS. The backup request corresponds to a virtual nonvolatile storage that is used by the client. The VIOS retrieves data from the nonvolatile storage device where the virtual nonvolatile storage is stored. The VIOS transmits the retrieved data to a backup server via a computer network, such as the Internet. In one embodiment, a backup software application runs on the VIOS client and a backup proxy software application runs on the VIOS.

20 Claims, 6 Drawing Sheets

SYSTEM AND METHOD FOR USING REMOTE MODULE ON VIOS TO MANAGE BACKUPS TO REMOTE BACKUP SERVERS

BACKGROUND OF THE INVENTION

1. Technical Field

The present invention relates to a system and method that manages backups of computer systems. More particularly, the present invention relates to a system and method that manages backups of servers that use a virtual input/output environment.

2. Description of the Related Art

A Virtual I/O Server (VIOS) is software that is located in a logical partition. This software facilitates the sharing of physical I/O resources between client logical partitions within the server computer system. The VIOS provides a virtual storage (e.g., SCSI) target and shared network (e.g., Ethernet) adapter capability to client logical partitions within the system, allowing the client logical partitions to share SCSI devices and Ethernet adapters. The VIOS software is often installed in a logical partition that is dedicated solely for the VIOS' use.

Using the VIOS benefits the computer system in various ways. These benefits include sharing of physical resources between logical partitions on the system, creating logical partitions without requiring additional physical I/O resources, creating more logical partitions than there are I/O slots or physical devices available with the ability for partitions to have dedicated I/O, virtual I/O, or both, maximizing use of physical resources on the system, and helping to reduce the Storage Area Network (SAN) infrastructure.

However, while the use of a VIOS is highly beneficial in a computer system, its use is not without certain challenges. One of these challenges is encountered when a client of the VIOS backs up virtual storage to a network-accessed backup server. To perform a backup using a traditional VIOS, the VIOS client (e.g., a server running a Linux™ or AIX™ operating system) retrieves data included in its virtual storage through the VIOS and sends the same data to the backup server with the data again passing through the VIOS since both the network adapter and the storage adapter are virtualized and provided by the VIOS. This type of backup activity can create a bottleneck in the channels used to transport the data between the VIOS client and the VIOS. This bottleneck can lead to lower system throughput and less efficient use of system resources. What is needed, therefore, is a system and method that reduces traffic between the VIOS and a VIOS client when the VIOS client is backing up data to a backup server.

SUMMARY

It has been discovered that the aforementioned challenges are resolved using a system, method and computer program product that receives a backup request at a virtual input/output server (VIOS) from a client of the VIOS. The backup request corresponds to a virtual nonvolatile storage that is used by the client. The VIOS retrieves data from the nonvolatile storage device where the virtual nonvolatile storage is stored. The VIOS transmits the retrieved data to a backup server via a computer network, such as the Internet.

In one embodiment, the receiving, retrieving, and transmitting are each performed by a backup proxy software application running on the VIOS. In this embodiment, the receiving further includes receiving the backup request through a communication channel managed by a hypervisor software application. The backup request includes a backup initialization message and a management datagram. The datagram identifies the virtual nonvolatile storage to be backed up, and the retrieving further includes retrieving the data included in the nonvolatile storage identified in the management datagram. In this embodiment, the transmitting further includes initiating a backup session with the backup server. The initiating including sending one or more authentication keys from the client to the backup server. After the session is initiated, the retrieved data is transmitted from the VIOS to the backup server.

In another embodiment, a communication channel is established between a software-based virtual network adapter running on the client and a software-based shared network adapter running on the VIOS. In this embodiment, the communication channel is managed by a hypervisor software application. The client, the VIOS and the hypervisor software application are all running on the same computer system. Authentication keys sent by the client are received at the VIOS software-based shared network adapter. A connection is established between the software-based shared network adapter running on the VIOS and a physical network adapter with the hypervisor software application managing the physical network adapter. The physical network adapter connects the computer system to the computer network. The hypervisor software application transmits the authentication keys through the computer network to the backup server over the physical network adapter.

In a further embodiment, a command-request queue is established between a software-based virtual client storage adapter running on the client and a software-based virtual storage adapter running on the VIOS. In this further embodiment, the command-request queue is managed by the hypervisor software application, and a storage connection is established between the software-based virtual storage adapter running on the VIOS and a physical nonvolatile storage adapter that connects the computer system to a nonvolatile storage device where the virtual nonvolatile storage is stored. Again, the hypervisor software application manages the physical nonvolatile storage adapter.

In one embodiment, the backup request is sent from a backup software application running on the client to the VIOS. In this embodiment, a backup proxy software application running on the VIOS is initialized in response to receiving the backup request. In this embodiment, the backup proxy software application performs the retrieving and the transmitting.

In one embodiment, a backup session is initialized with the backup server by sending an initiation request from the client to the backup server. The client creates the backup request that includes a special management datagram that includes one or more authentication keys used in the backup session. The backup request is sent from the client to the VIOS. The data retrieved from the nonvolatile storage device is transmitted from the VIOS to the backup server. The transmitting includes creating backup data packets using the retrieved data and the authentication keys, and transmitting the backup data packets from the VIOS to the backup session initiated with the backup server.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
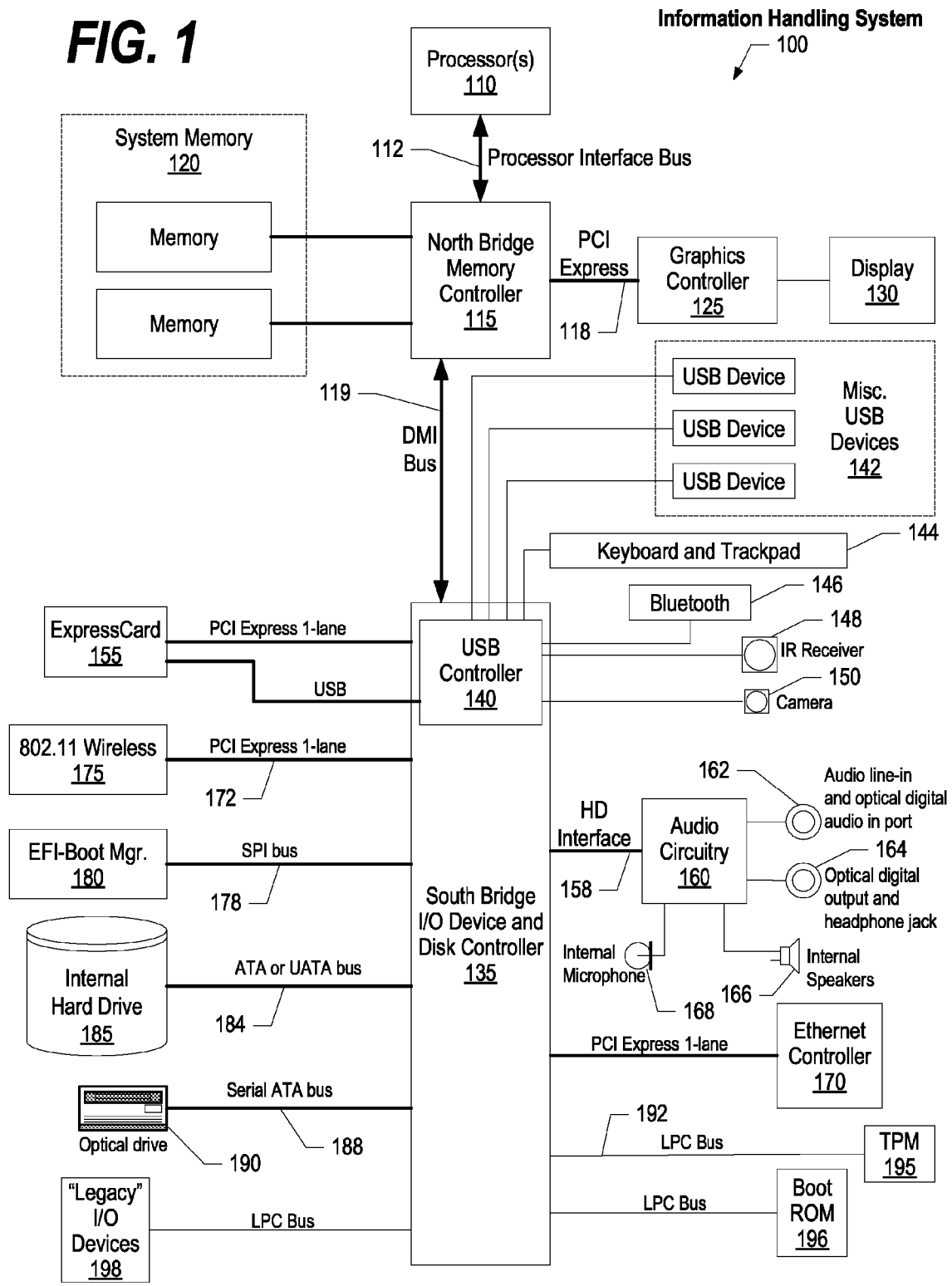
FIG. 1 is a block diagram of a data processing system in which the methods described herein can be implemented.
Figure 2:
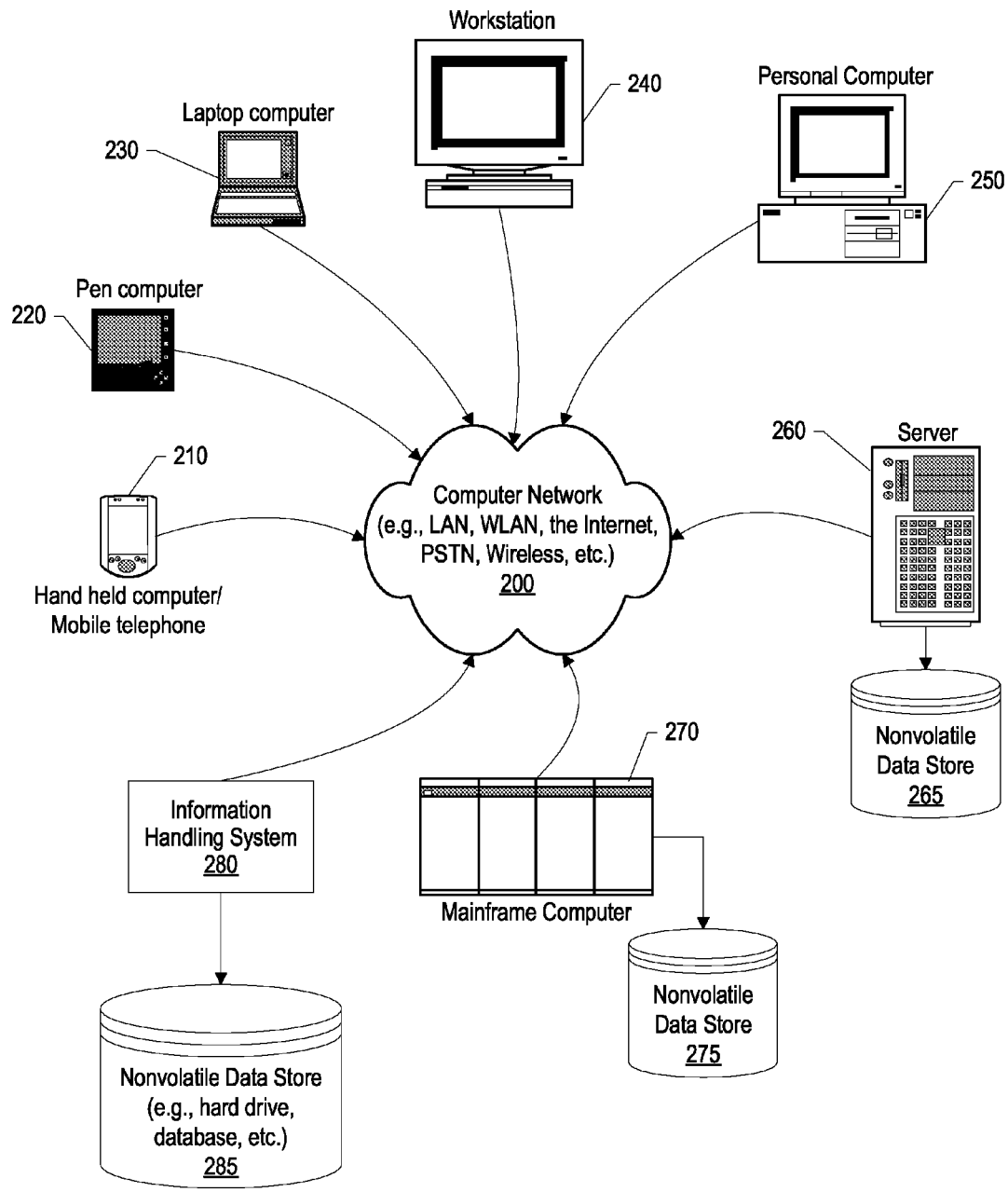
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
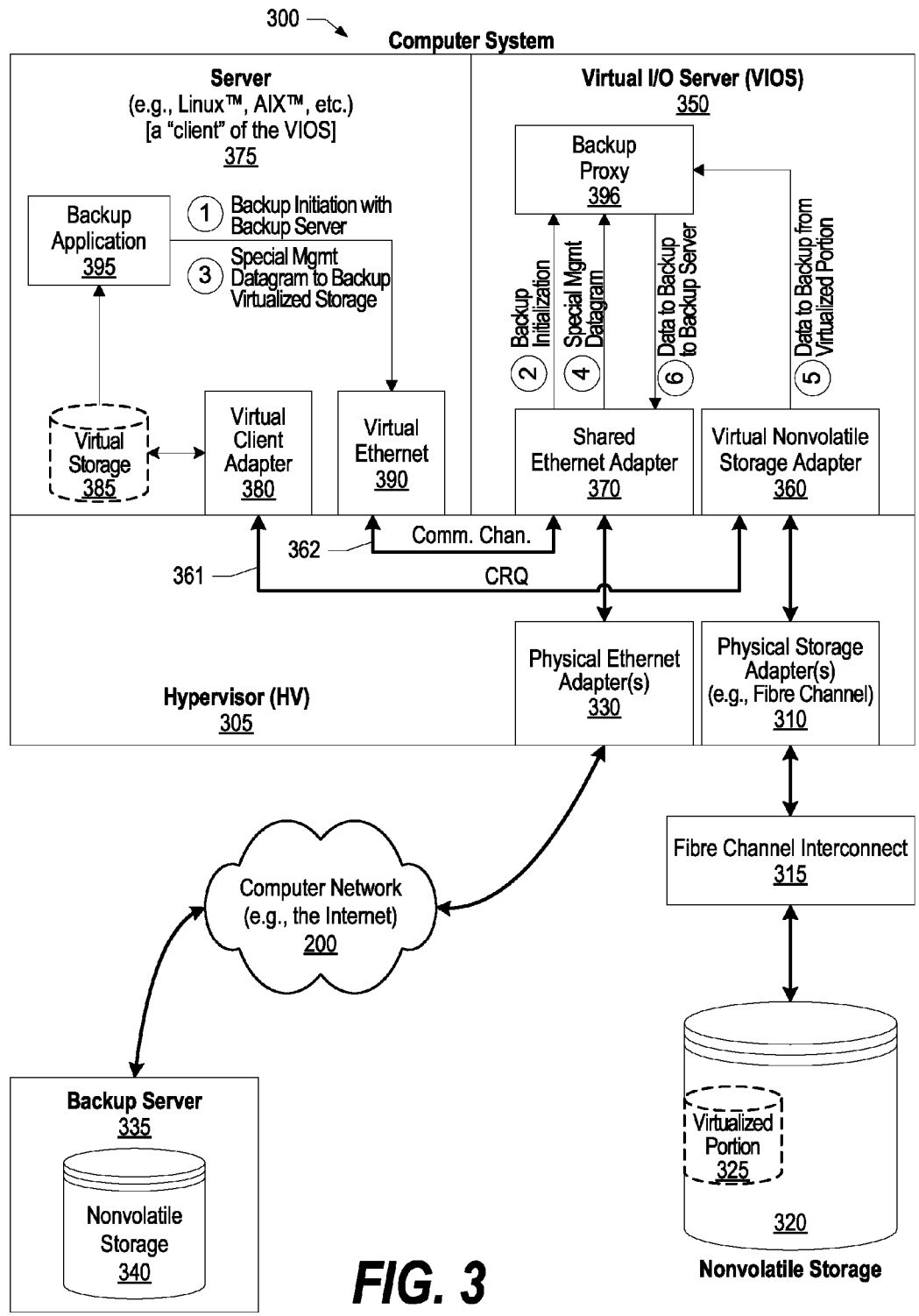
FIG. 3 is a system and network diagram showing interaction between the virtual I/O server (VIOS), the VIOS client, and the hypervisor to retrieve virtual storage from a nonvolatile storage and send to an external backup server via a computer network.

FIG. 3 is a system and network diagram showing interaction between the virtual I/O server (VIOS), the VIOS client, and the hypervisor to retrieve virtual storage from a nonvolatile storage and send to an external backup server via a computer network. Computer system 300 is shown partitioned into hypervisor software application 305, virtual I/O server (VIOS) 350, and server 375. Server 375 is a client of the VIOS (a VIOS client), and uses the VIOS to perform I/O operations, such as accessing a computer network, such as the Internet, as well as accessing nonvolatile storage, such as nonvolatile storage 320. As known by those skilled in the art, a hypervisor (also known as a "virtual machine monitor") is a virtualization platform that allows multiple operating systems to run on computer system 300 at the same time. The term usually refers to an implementation using full virtualization. Hypervisors are often classified in two types. A Type 1 hypervisor (or Bare-Metal Architecture) is software that runs directly on a given hardware platform (as an operating system control program). A "guest" operating system thus runs at the second level above the hardware. A Type 2 hypervisor (or Hosted Architecture) is software that runs within an operating system environment. A "guest" operating system thus runs at the third level above the hardware. As used herein, hypervisor 305 includes both Type 1 and Type 2 hypervisors. VIOS 350 and Server 375 run as guest operating systems on the hypervisor. VIOS 350 allows one or more VIOS clients, such as server 375, to share a network adapter, such as shared Ethernet adapter 370, as well as a nonvolatile storage device, such as nonvolatile storage 320 shared using virtual nonvolatile storage adapter 360, such as a virtual SCSI disk. Hypervisor 305 manages physical devices that are virtualized and used by the VIOS to service virtualized requests from VIOS clients, such as server 375. Hypervisor manages physical network adapters, such as physical Ethernet adapter(s) 330 as well as physical nonvolatile storage adapters, such as Fibre Channel adapter 310 which accesses nonvolatile storage 320 via Fibre Channel Interconnect 315.

VIOS client 375 is often a server running an operating system such as Linux™, AIX™, or other server operating system. Using the VIOS, VIOS client 375 accesses virtual storage 385 which is virtualized portion 325 of nonvolatile storage 320. VIOS client 375 further accesses a computer network, such as the Internet, using a software-based virtual network adapter, such as virtual Ethernet adapter 390. VIOS client 375 accesses virtual storage 385 by using VIOS server 350. Virtual client storage adapter 380 is a software process running in VIOS client 375. Virtual client storage adapter 380 communicates with virtual nonvolatile storage adapter 360 which is a software process running in VIOS 350. Hypervisor 305 manages the communication between VIOS client 375 and VIOS 350 using command-response queue (CRQ) 361. In one embodiment, CRQ includes two queues—one for sending commands from VIOS client 375 to VIOS 350 and one for returning responses from VIOS 350 back to VIOS client 375. Hypervisor 305 manages a connection between software-based virtual nonvolatile storage adapter 360 and physical storage adapter 310.

Likewise, network communication to and from VIOS client 375 are virtualized. Software-based client virtual network adapter 390, such as an Ethernet adapter, runs in VIOS client 375 and communicates with software-based shared network adapter 370 running in VIOS 350. Again, hypervisor 305 manages the communications between client virtual adapter 380 and VIOS virtual adapter 370 using communications channel 362. In one embodiment, communications channel 362 is a software-based communications channel. Hypervisor 305 manages the connection between software-based shared network adapter 370 running in VIOS 350 and one or more physical network adapters 330, such as physical Ethernet adapters. These physical network adapters link computer system 300 with computer network 200, such as the Internet. Other computer systems also link to computer network 200, such as backup server 335, which allows computer system 300 to communicate with such other computer systems. In the case of backup server 335, the link between computer system 300 and backup server 335 allows the computer system to send data to backup server 335 and have such data stored on nonvolatile storage 340 which is maintained and managed by the backup server. By virtualizing the network and storage adapters and having these adapters managed by VIOS 350, several VIOS clients, including VIOS client 375 can utilize the computer network and nonvolatile storage from VIOS 350. In this manner, virtual I/O provides the capability for a single physical I/O adapter and disk to be used by multiple logical partitions of the same server, allowing consolidation of I/O resources and minimizing the number of I/O adapters required. Likewise, a function of the hypervisor, virtual network (LAN) allows secure communication between logical partitions without the need for a physical I/O adapter. The ability to securely share Ethernet bandwidth across multiple partitions increases hardware utilization.

Backup software application 395 runs in VIOS client 375, such as a Linux™ based server running on computer system 300. At step (1), the VIOS client initiates backup processing with backup server 335. Such initiation often requires authentication keys used to authenticate VIOS client 375 to backup server 335. The backup initialization request is transmitted through client server-based virtual network adapter 390, through communication channel 362, to software-based shared network adapter 370 managed by VIOS 350. The request is then sent through physical network adapter 330 through computer network 200, such as the Internet, to backup server 335 based upon the network address included in the backup initialization request. In one embodiment, at step (2), the backup initialization request is also transmitted to backup proxy software application 396 that runs on VIOS 350 in conjunction with backup software application 395. The initialization request may, for example, be used to initiate or invoke the backup proxy software application and ready the proxy application for the backup operations that are about to take place. At step (3), backup software application 395 sends a special management datagram to backup virtual storage 385. In one embodiment, this datagram includes the authentication keys needed to send backup data to the backup server. The datagram is transmitted through client virtual network adapter 390 through communications channel 362 managed by the hypervisor to shared software-based network adapter 370 in VIOS 350 where, at step (4), the datagram is transmitted to backup proxy application 396.

Backup proxy software application 396 retrieves data to backup from nonvolatile 320 at step (5). This data corresponds to virtual portion 325 of nonvolatile storage 320 which is seen as virtual storage 385 by VIOS client 375. At step (6), the data retrieved by backup proxy software application 396 is sent through software-based network adapter 370 and physical network adapter 330 where it is transmitted through computer network 200 and received by backup server 335. In one embodiment, backup proxy application 396 creates data packets of data to send to the backup server with the data packets including authentication data (e.g., authentication keys) as well as the data to be backed up. These data packets are addressed to the backup server (e.g., using the backup server's Internet Protocol (IP) address or other network address). Backup server 335 receives the data packets and, after performing any needed authentication, stores the backup on the backup server's nonvolatile storage 340. As described above using the backup proxy software application, the data to be backed up is retrieved from nonvolatile 320 and transmitted to the backup server without transmitting the retrieved data to the VIOS client through CRQ 361. In this manner, by reducing data transmission across CRQ 361 system throughput and efficiency is increased when backing up virtual storage being used by a VIOS client, such as virtual storage 385 being used by VIOS client 375.

Figure 4:
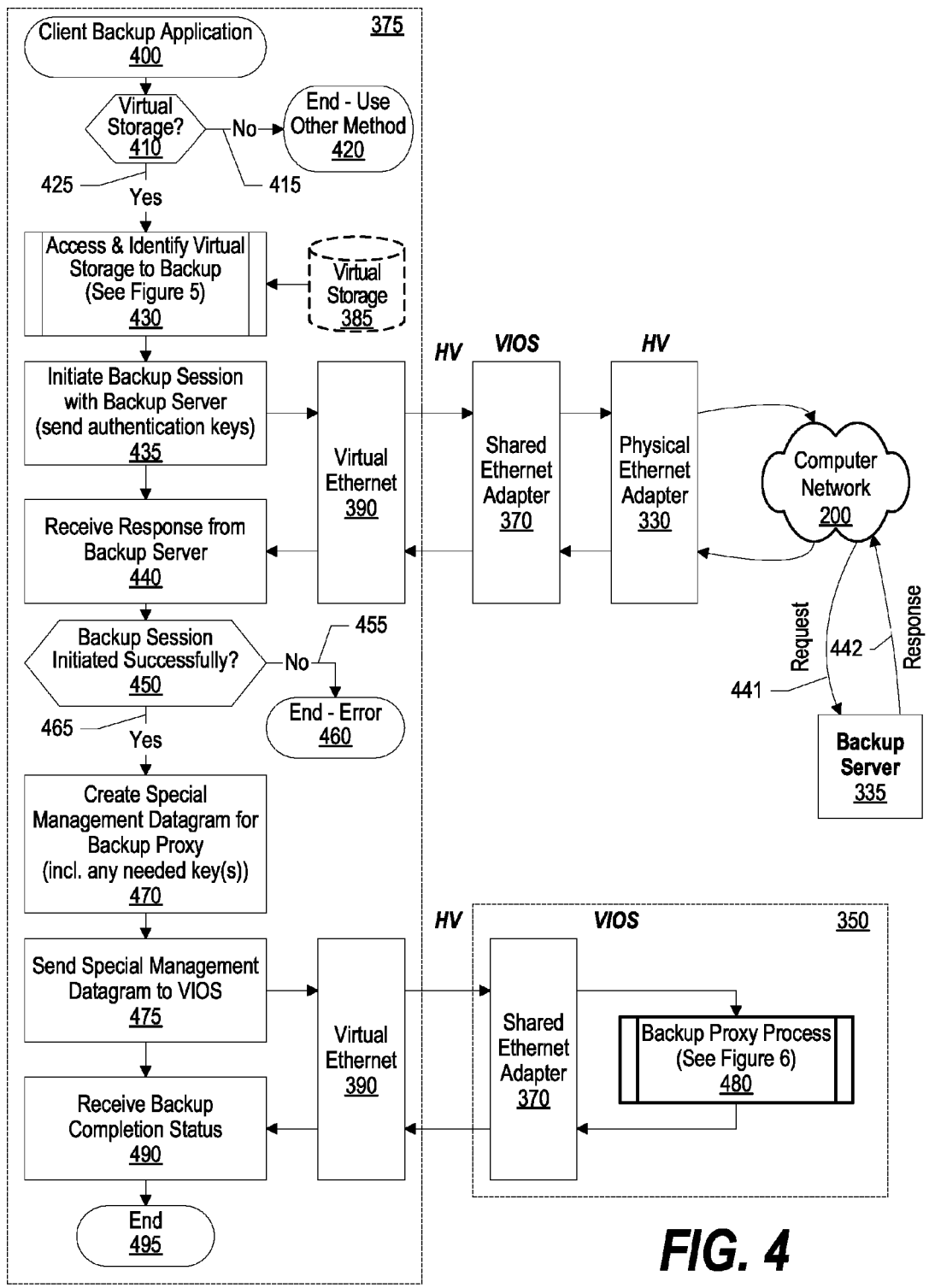
FIG. 4 is a flowchart showing steps taken from the point of view of a client backup application that is backing up a virtual disk.

FIG. 4 is a flowchart showing steps taken from the point of view of a client backup application that is backing up a virtual disk. Client backup processing is running inside VIOS client 375. Client backup processing commences at 400 whereupon a determination is made as to whether the storage that is being backed up is virtual storage (e.g., a virtual disk) at decision 410. If the storage that is being backed up is not virtual storage, then decision 410 branches to "no" branch 415 whereupon, at 420, a traditional method is used to backup non-virtual storage. On the other hand, if the storage being backed up is virtual storage, then decision 410 branches to "yes" branch 425 in order to backup the virtual storage.

Figure 5:
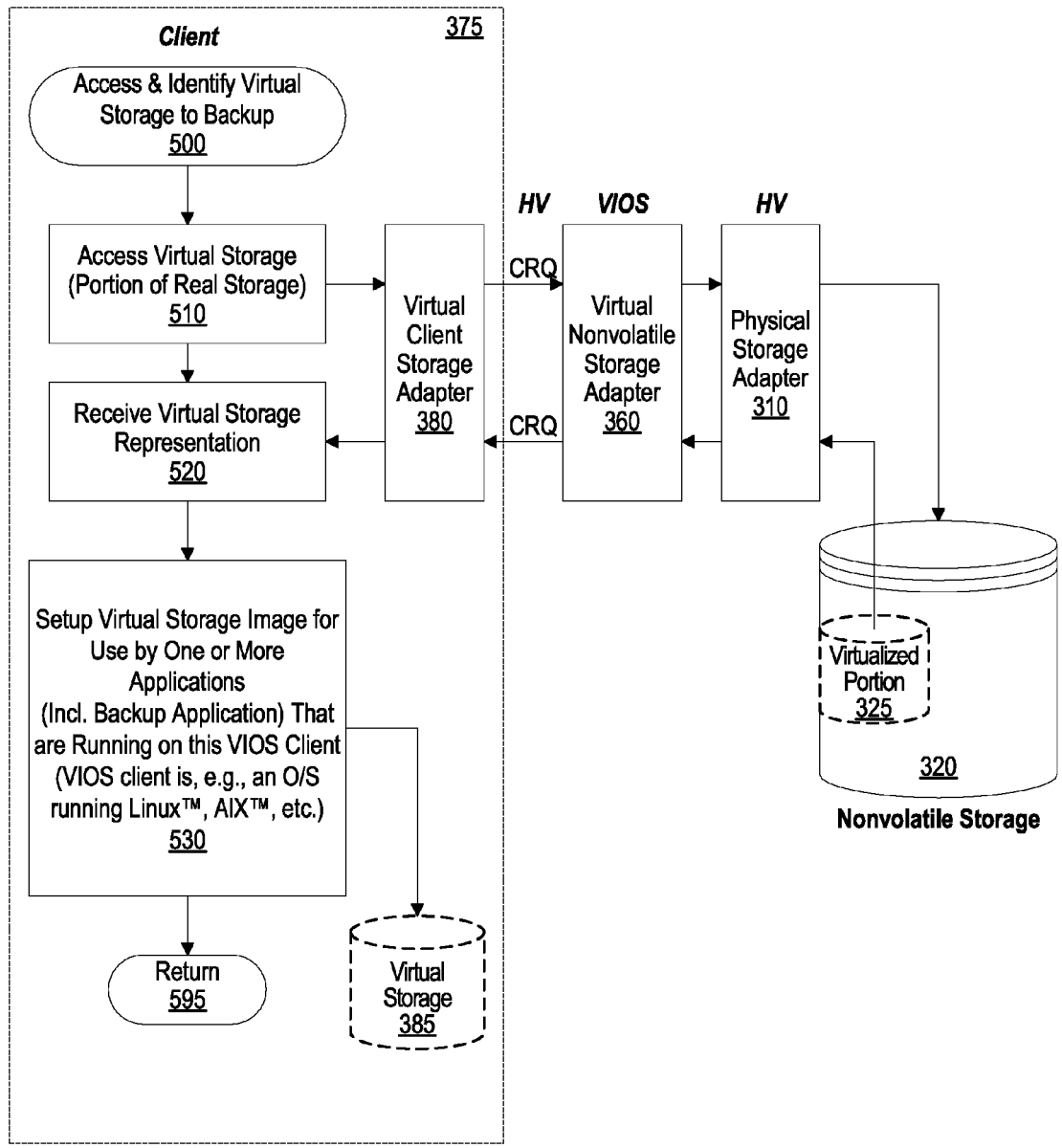
FIG. 5 is a flowchart showing steps taken to access and identify virtual storage to backup from the client backup application.

At predefined process 430, virtual storage 385 that is being backed up is identified and accessed (see FIG. 5 and corresponding text for processing details). At step 435, a backup session is initiated with a backup server. The initiation of the backup session also includes sending any authentication keys that are used to identify and authenticate the VIOS client to the backup server. As shown, the request to initiate a backup session is sent through virtual software-based network adapter 390 running on VIOS client 375, through the hypervisor to shared software-based network adapter 370 running on the VIOS where it is transmitted by the hypervisor through physical network adapter 330 to computer network 200 where it is transmitted to backup server 335 as request 441. Backup server 335 sends response 442 back through computer network 200 to the computer system where VIOS client 375 and VIOS 350 are operating where the response is received by the hypervisor at physical network adapter 330, sent back through VIOS shared software-based network adapter 370 where it is sent through the hypervisor to VIOS client 375 where it is received, at step 440, at the client's virtual network adapter 390. A determination is made as to whether the backup session was initiated successfully (decision 450). If the backup session was not successfully initiated with the backup server, then decision 450 branches to "no" branch 455 whereupon processing ends at 460.

On the other hand, if the backup session was successfully initiated with the backup server, then decision 450 branches to "yes" branch 465 whereupon, at step 470, one or more special datagrams is/are created that directs the backup proxy software application to backup virtual storage 385. The special datagram(s) also convey, if necessary, any authentication keys that the backup proxy software application will need to send data to be backed up to the backup sever. At step 475, the special datagram(s) are sent to the backup proxy application running on VIOS 350. As shown, VIOS client 375 sends the datagram(s) through its software-based virtual network adapter 390 where it is transported by the hypervisor to shared software-based network adapter 370 that is managed by VIOS 350. The VIOS recognizes the special datagram(s) and, rather than transmitting the datagram(s) using the physical network adapter, the VIOS provides the datagram(s) to backup proxy software application (predefined process 480, see FIG. 6 and corresponding text for backup proxy processing details). After the backup proxy software application completes the backup session with the backup server, it sends a completion response back to VIOS client 375 through the VIOS' shared software-based network adapter, through the hypervisor, to the VIOS client's virtual network adapter 390 where it is received by the backup application running on the VIOS client at step 490. VIOS client backup processing thereafter ends at 495.

FIG. 5 is a flowchart showing steps taken to access and identify virtual storage to backup from the client backup application. Processing commences at 500 whereupon, at step 510, the VIOS client accesses virtual storage. The virtual storage is a portion (virtualized portion 325) of real nonvolatile storage (nonvolatile storage 320). Virtualized portion 325 has been assigned, either exclusively or in a shared manner, to the VIOS client that is running the backup software application. Likewise other partitions (e.g., other servers) running on the computer system can have other virtual storage which are other virtualized portions of nonvolatile storage 320. Similarly, other partitions running on the computer system can also run backup software applications that interface with the backup proxy software application (or other backup proxy software applications) that are running on the VIOS. As shown, to access the virtual storage, software-based virtual client storage adapter sends an access request to the VIOS software-based virtual nonvolatile storage adapter 360. As shown, the hypervisor is used to transmit the command using the command-response queue (CRQ). The VIOS' software-based virtual nonvolatile storage adapter sends the request to the nonvolatile storage via physical nonvolatile storage adapter 310 which is managed by the hypervisor. The response, which is a virtual storage representation of virtualized portion 325, is sent back through physical nonvolatile storage adapter 310 to the VIOS virtual software-based nonvolatile storage adapter where it is transmitted by the hypervisor using the CRQ back to VIOS client 375 where it is received at step 520.

At step 530, virtual storage image 385 is setup for use at VIOS client 375 by one or more applications, such as the backup software application, that are running on the VIOS client. Data included in this virtual storage image is backed up by sending the special datagram to the backup proxy software application running on the VIOS. After the virtual storage image has been setup, processing returns to the calling routine (see FIG. 4) at 595.

Figure 6:
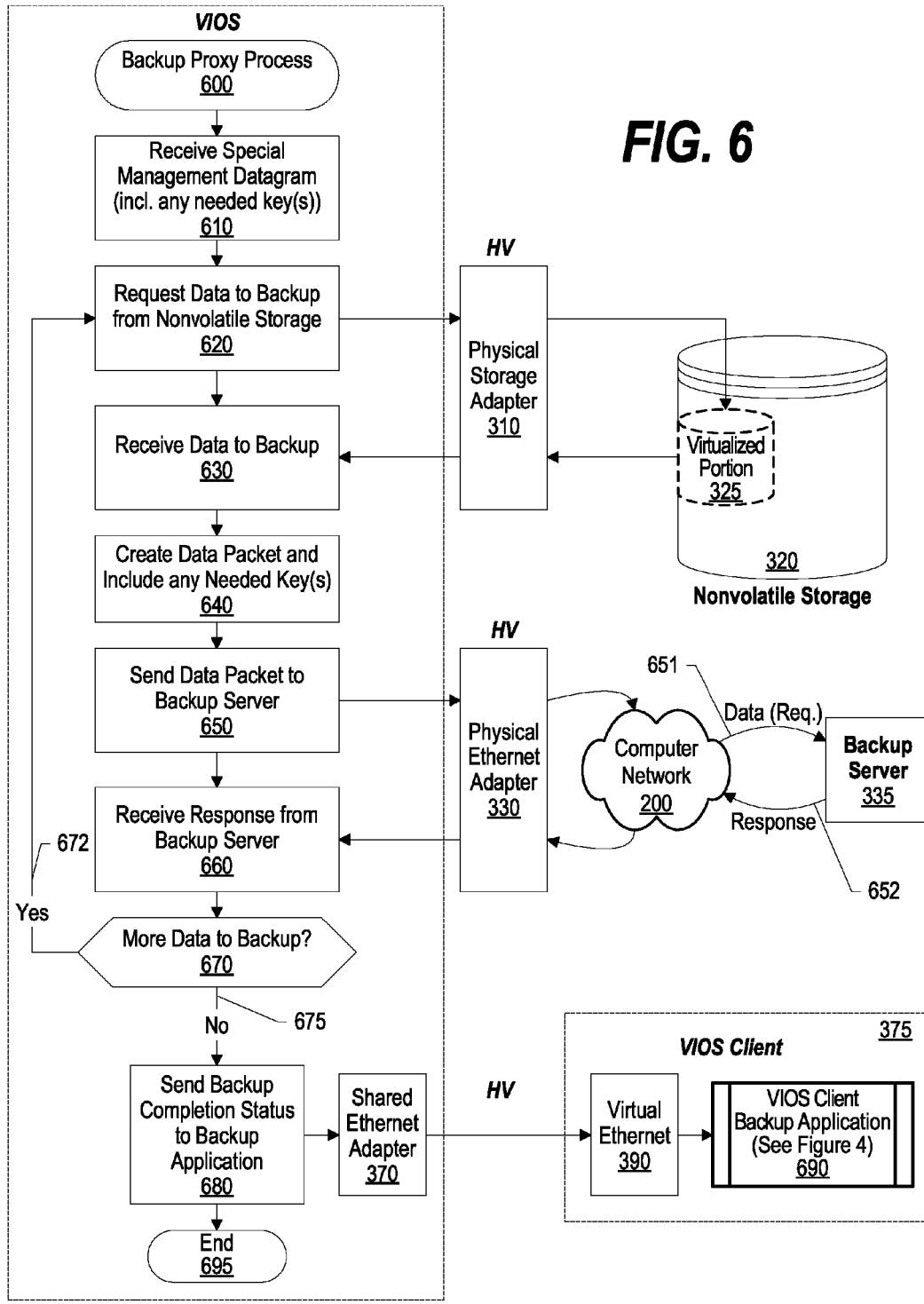
FIG. 6 is a flowchart showing steps taken from the point of view of a backup proxy application running on the VIOS.

FIG. 6 is a flowchart showing steps taken from the point of view of a backup proxy application running on the VIOS. Processing commences at 600 whereupon, at step 610, the backup proxy software application receives the special management datagram from the VIOS client's backup application. The special management datagram instructs the backup proxy software application to backup a virtualized storage that is used by the VIOS client. The virtualized storage (e.g., a virtual disk) is a virtualized portion 325 of physical nonvolatile storage 320. At step 630, the backup proxy software application running on the VIOS requests data to backup from nonvolatile storage 320. The request is sent through the hypervisor manages physical nonvolatile storage adapter 310 that is used to is access nonvolatile storage 320. The data to be backed up is retrieved and sent back to the backup proxy software application through physical nonvolatile storage adapter 310 where it is received by the backup proxy software application at step 630.

At step 640, one or more data packets are created. These data packets include the data that was received at step 630 as well as any authentication keys that are needed to access the backup server. The created data packets are sent to the backup server at step 650. As shown, the backup proxy software application sends the data packets through physical Ethernet adapter 330 that is managed by the hypervisor. The data packets are transmitted through computer network 200 where they are received by backup server 335 as data packets 651. Backup server performs any needed authentication using any provided keys and, once authenticated, the backup server stores the data included in the data packets on a nonvolatile storage device managed by the backup server. Backup server 335 sends response 652 back to the backup proxy software application. Response 652 is transmitted back through computer network 200 where it is received at physical network adapter 330 managed by the hypervisor and sent back to the VIOS where it is received by the backup proxy software application at step 660. A determination is made as to whether there is more data to be retrieved from the nonvolatile storage and backed up (decision 670). If there is more data to backup, then decision 670 branches to "yes" branch 672 which loops back to request additional data from the nonvolatile storage, create additional data packets, and send the data packets to the backup server. This looping continues until there is no more data to backup, at which time decision 670 branches to "no" branch 675 whereupon, at step 680, a backup completion message is sent from the backup proxy software application to the backup software application that is running on VIOS client 375. As shown, the completion message is sent through software-based virtual network adapter 370 to VIOS client virtual software-based network adapter 390 using a communication interface managed by the hypervisor. The VIOS client backup application processes the completion message (predefined process 690, see FIG. 4 and corresponding text for VIOS client backup software application processing details). VIOS backup proxy software application processing thereafter ends at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a backup request at a virtual input/output server (VIOS) from a client of the VIOS, wherein the backup request corresponds to a virtual nonvolatile storage at the client, the virtual nonvolatile storage being a virtualized portion of a non-volatile storage device;
   retrieving, by the VIOS, data from the nonvolatile storage device corresponding to the virtual nonvolatile storage; and
   transmitting, by the VIOS, the retrieved data to a backup server via a computer network.

2. The method of claim 1 wherein the receiving, retrieving, and transmitting are each performed by a backup proxy software application running on the VIOS, and wherein:
   the receiving further including receiving the backup request through a communication channel managed by a hypervisor software application, wherein the backup request includes a backup initialization message and a management datagram, wherein the datagram identifies the virtual nonvolatile storage to be backed up;
   the retrieving further including retrieving the data included in the nonvolatile storage identified in the management datagram; and
   the transmitting further including:
      initiating a backup session with the backup server, the initiating including sending one or more authentication keys from the client to the backup server; and
      transmitting the retrieved data from the VIOS to the backup server after the initiating.

3. The method of claim 1 further comprising:
   establishing a communication channel between a software-based virtual network adapter running on the client and a software-based shared network adapter running on the VIOS, wherein the communication channel is managed by a hypervisor software application, and wherein the client, the VIOS and the hypervisor software application are executed by a computer system;
   receiving, from the client, one or more authentication keys at the VIOS software-based shared network adapter;
   establishing a connection between the software-based shared network adapter and a physical network adapter, wherein the hypervisor software application manages the physical network adapter, and wherein the physical network adapter connects the computer system to the computer network, the retrieved data transmitted from the VIOS to the backup server through the connection; and
   transmitting, by the hypervisor software application, the authentication keys through the computer network to the backup server.

4. The method of claim 3 further comprising:
   establishing a command-request queue between a software-based virtual client storage adapter running on the client and a software-based virtual storage adapter running on the VIOS, wherein the command-request queue is managed by the hypervisor software application; and
   establishing a storage connection between the software-based virtual storage adapter running on the VIOS and a physical nonvolatile storage adapter that connects the computer system to a nonvolatile storage device where the virtual nonvolatile storage is stored, wherein the hypervisor software application manages the physical nonvolatile storage adapter.

5. The method of claim 1 further comprising:
   sending the backup request from a backup software application running on the client to the VIOS; and
   initializing a backup proxy software application running on the VIOS in response to receiving the backup request, wherein the backup proxy software application performs the retrieving and the transmitting.

6. The method of claim 1 further comprising:
   initiating a backup session with the backup server by sending an initiation request from the client to the backup server;
   creating, at the client, the backup request, wherein the backup request includes a special management datagram that includes one or more authentication keys used in the backup session;
   sending the backup request from the client to the VIOS;
   transmitting the retrieved data from the VIOS to the backup server, the transmitting including:
      creating one or more backup data packets using the retrieved data and the authentication keys included in the special management datagram; and
      transmitting the backup data packets from the VIOS to the backup session initiated with the backup server.

7. The method of claim 1 further comprising:
   receiving a plurality of backup requests, including the backup request, from a plurality of VIOS clients, including the client of the VIOS, wherein the plurality of backup requests correspond to a plurality of virtual nonvolatile storage areas that include the virtual nonvolatile storage;
   transmitting one or more sets of authentication keys corresponding to one or more of the plurality of backup requests from one or more of the plurality of clients;
   establishing a plurality of backup sessions with one or more backup servers, that include the backup server, wherein one or more of the backup sessions are established using one or more of the sets of authentication keys;
   retrieving a plurality of data sets from one or more nonvolatile storage devices, wherein one of the data sets includes the data and wherein one of the nonvolatile storage devices is the nonvolatile storage device; and
   transmitting the data sets to the one or more backup servers via the computer network.

8. An information handling system comprising:
   one or more processors;
   a memory accessible by at least one of the processors;
   a nonvolatile storage device accessible by at least one of the processors;
   a network adapter that connects the information handling system to a computer network;
   a set of instructions stored in the memory and executed by at least one of the processors in order to perform actions of:
      receiving a backup request at a virtual input/output server (VIOS) from a client of the VIOS, wherein the backup request corresponds to a virtual nonvolatile storage at the client, the virtual nonvolatile storage being a virtualized portion of the nonvolatile storage device, wherein the client and the VIOS are software programs executed by the one or more processors;
      retrieving, by the VIOS, data from the nonvolatile storage device corresponding to the virtual nonvolatile storage; and
      transmitting, by the VIOS, the retrieved data to a backup server through the computer network via the network adapter.

9. The information handling system of claim 8 wherein the receiving, retrieving, and transmitting are each performed by a backup proxy software application running on the VIOS, and wherein:

the receiving further including receiving the backup request through a communication channel managed by a hypervisor software application running on the information handling system, wherein the backup request includes a backup initialization message and a management datagram, wherein the datagram identifies the virtual nonvolatile storage to be backed up;

the retrieving further including retrieving the data included in the nonvolatile storage identified in the management datagram; and the transmitting further including:
  initiating a backup session with the backup server, the initiating including sending one or more authentication keys from the client to the backup server; and
  transmitting the retrieved data from the VIOS to the backup server after the initiating.

10. The information handing system of claim 8 wherein the set of instructions, when executed, cause at least one of the processors to perform further actions comprising:

establishing a communication channel between a software-based virtual network adapter running on the client and a software-based shared network adapter running on the VIOS, wherein the communication channel is managed by a hypervisor software application;

receiving, from the client, one or more authentication keys at the VIOS software-based shared network adapter;

establishing a connection between the software-based shared network adapter and the network adapter, wherein the hypervisor software application manages the physical network adapter, and wherein the network adapter connects the information handling system to the computer network, the retrieved data transmitted from the VIOS to the backup server through the connection; and transmitting, by the hypervisor software application, the authentication keys through the computer network to the backup server.

11. The information handling system of claim 10 wherein the set of instructions, when executed, cause at least one of the processors to perform further actions comprising:

establishing a command-request queue between a software-based virtual client storage adapter running on the client and a software-based virtual storage adapter running on the VIOS, wherein the command-request queue is managed by the hypervisor software application; and establishing a storage connection between the software-based virtual storage adapter running on the VIOS and a nonvolatile storage adapter that connects the information handling system to the nonvolatile storage device where the virtual nonvolatile storage is stored, wherein the hypervisor software application manages the nonvolatile storage adapter.

12. The information handling system of claim 8 wherein the set of instructions, when executed, cause at least one of the processors to perform further actions comprising:

sending the backup request from a backup software application running on the client to the VIOS; and initializing a backup proxy software application running on the VIOS in response to receiving the backup request, wherein the backup proxy software application performs the retrieving and the transmitting.

13. The information handing system of claim 8 wherein the set of instructions, when executed, cause at least one of the processors to perform further actions comprising:

initiating a backup session with the backup server by sending an initiation request from the client to the backup server;

creating, at the client, the backup request, wherein the backup request includes a special management datagram that includes one or more authentication keys used in the backup session;

sending the backup request from the client to the VIOS;

transmitting the retrieved data from the VIOS to the backup server, the transmitting including:
  creating one or more backup data packets using the retrieved data and the authentication keys included in the special management datagram; and
  transmitting the backup data packets from the VIOS to the backup session initiated with the backup server.

14. A computer program product stored in a computer readable medium, comprising functional descriptive material that, when executed by an information handling system, causes the information handling system to perform actions that include:

receiving a backup request at a virtual input/output server (VIOS) from a client of the VIOS, wherein the backup request corresponds to a virtual nonvolatile storage at the client, the virtual nonvolatile storage being a virtualized portion of a nonvolatile storage device;

retrieving, by the VIOS, data from the nonvolatile storage device corresponding to the virtual nonvolatile storage; and transmitting, by the VIOS, the retrieved data to a backup server via a computer network.

15. The computer program product of claim 14 wherein the receiving, retrieving, and transmitting are each performed by a backup proxy software application running on the VIOS, and wherein:

the receiving further including receiving the backup request through a communication channel managed by a hypervisor software application, wherein the backup request includes a backup initialization message and a management datagram, wherein the datagram identifies the virtual nonvolatile storage to be backed up;

the retrieving further including retrieving the data included in the nonvolatile storage identified in the management datagram; and the transmitting further including:
  initiating a backup session with the backup server, the initiating including sending one or more authentication keys from the client to the backup server; and
  transmitting the retrieved data from the VIOS to the backup server after the initiating.

16. The computer program product of claim 14 further comprising functional descriptive material that causes the data processing system to perform additional actions that include:

establishing a communication channel between a software-based virtual network adapter running on the client and a software-based shared network adapter running on the VIOS, wherein the communication channel is managed by a hypervisor software application, and wherein the client, the VIOS and the hypervisor software application are executed by a computer system;

receiving, from the client, one or more authentication keys at the VIOS software-based shared network adapter;

establishing a connection between the software-based shared network adapter and a physical network adapter, wherein the hypervisor software application manages the physical network adapter, and wherein the physical network adapter connects the computer system to the computer network, the retrieved data transmitted from the VIOS to the backup server through the connection; and transmitting, by the hypervisor software application, the authentication keys through the computer network to the backup server.

17. The computer program product of claim 16 further comprising functional descriptive material that causes the data processing system to perform additional actions that include:

establishing a command-request queue between a software-based virtual client storage adapter running on the client and a software-based virtual storage adapter running on the VIOS, wherein the command-request queue is managed by the hypervisor software application; and establishing a storage connection between the software-based virtual storage adapter running on the VIOS and a physical nonvolatile storage adapter that connects the computer system to a nonvolatile storage device where the virtual nonvolatile storage is stored, wherein the hypervisor software application manages the physical nonvolatile storage adapter.

18. The computer program product of claim 14 further comprising functional descriptive material that causes the data processing system to perform additional actions that include:

sending the backup request from a backup software application running on the client to the VIOS; and initializing a backup proxy software application running on the VIOS in response to receiving the backup request, wherein the backup proxy software application performs the retrieving and the transmitting.

19. The computer program product of claim 14 further comprising functional descriptive material that causes the data processing system to perform additional actions that include:

initiating a backup session with the backup server by sending an initiation request from the client to the backup server;

creating, at the client, the backup request, wherein the backup request includes a special management datagram that includes one or more authentication keys used in the backup session;

sending the backup request from the client to the VIOS;

transmitting the retrieved data from the VIOS to the backup server, the transmitting including:

creating one or more backup data packets using the retrieved data and the authentication keys included in the special management datagram; and transmitting the backup data packets from the VIOS to the backup session initiated with the backup server.

20. The computer program product of claim 14 further comprising functional descriptive material that causes the data processing system to perform additional actions that include:

receiving a plurality of backup requests, including the backup request, from a plurality of VIOS clients, including the client of the VIOS, wherein the plurality of backup requests correspond to a plurality of virtual nonvolatile storage areas that include the virtual nonvolatile storage;

transmitting one or more sets of authentication keys corresponding to one or more of the plurality of backup requests from one or more of the plurality of clients;

establishing a plurality of backup sessions with one or more backup servers, that include the backup server, wherein one or more of the backup sessions are established using one or more of the sets of authentication keys;

retrieving a plurality of data sets from one or more nonvolatile storage devices, wherein one of the data sets includes the data and wherein one of the nonvolatile storage devices is the nonvolatile storage device; and transmitting the data sets to the one or more backup servers via the computer network.

* * * * *